March 17, 1964     B. KAISER     3,125,255
WATERING DEVICE FOR PLANTS
Filed May 29, 1961
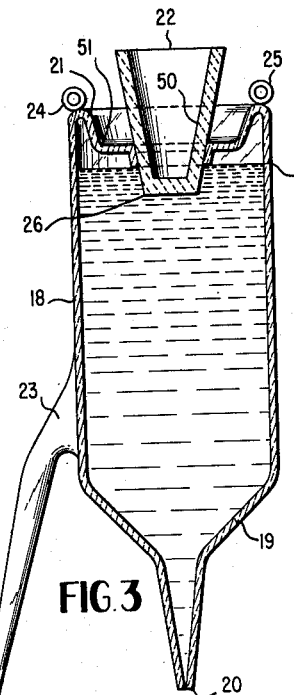
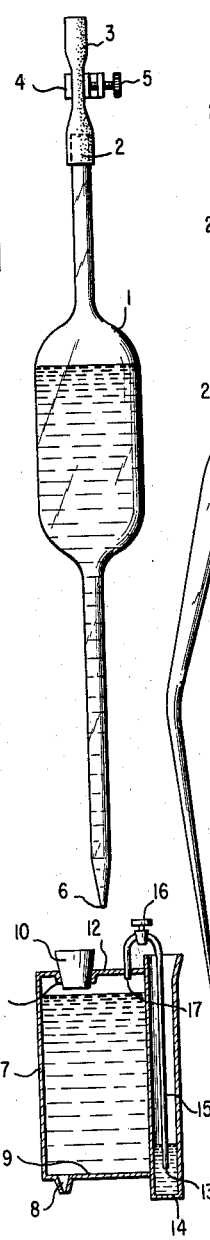
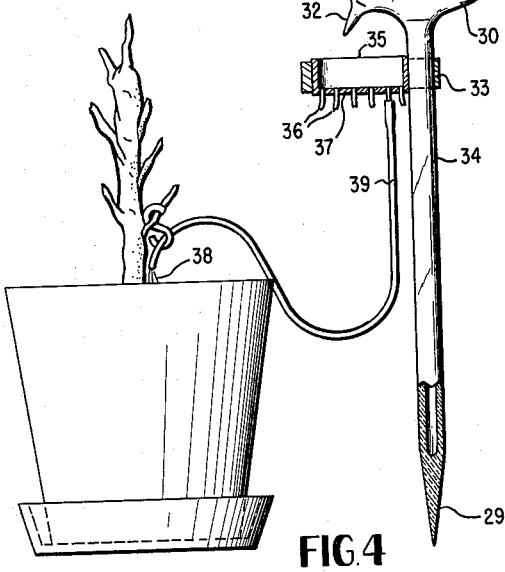
FIG.1     FIG.2     FIG.3     FIG.4
INVENTOR.
BERNHARD KAISER
BY
*Rupert J. Brady*
ATTORNEY

United States Patent Office 3,125,255
Patented Mar. 17, 1964

3,125,255
WATERING DEVICE FOR PLANTS
Bernhard Kaiser, Lagerstr. 76, Burgfarrnbach, near
Fuerth, Bavaria, Germany
Filed May 29, 1961, Ser. No. 131,031
6 Claims. (Cl. 222—189)

This invention relates to an appropriate, and to a great extent, self-acting watering device for plants.

One of the objects of my invention is to provide a watering device for plants enabling minute dropwise water metering over an extended period.

Another object of the invention is to provide a water chamber for watering plants in which the air inlet to the chamber is controlled by the amount of moisture in the member closing the chamber.

Still another object of the invention is to provide a plant watering device capable of constantly dispersing only a few droplets per hour.

A further object of the invention is to provide a plant watering device having new and novel means for controlling the amount of air entering a metering chamber and thus controlling the amount of water dropping from the chamber.

Other and further objects of the invention will become apparent from the specification hereinafter following by reference to the four forms of a watering device constructed in accordance with the present invention illustrated in the drawings, in which:

FIG. 1 is a side elevational view showing the simplest form of a watering device disclosing the principle of the present invention;

FIG. 2 is a vertical sectional view showing another type of watering device constructed according to the invention in which the quantity of water exposed to evaporation closes the air inlet to the chamber;

FIG. 3 is a longitudinal sectional view of a third type of watering device constructed in accordance with the invention in which a porous stopper closes the air inlet; and FIG. 4 is a side elevational view, partly in vertical section, showing another modified form of the watering device of the invention.

Referring to the drawings in greater detail in FIG. 1, reference character 1 represents the usual known type of pipette used to form a watering device operating in accordance with the broad principle of the invention. As shown, a short piece of hose 3 is connected to the upper end portion 2 of the pipette, with the other end of the hose open to the atmosphere, and the hose is restricted or pressed together by a hose clamp 4 of conventional construction. By turning the knurled-head screw 5 of the hose clamp it is possible to adjust the restriction of the hose air passage and thereby adjust relatively accurately the quantity of water which is expected to discharge from the bottom outlet 6 of the pipette over a given period.

The watering device represented in FIG. 2 is arranged to go into action after a certain time, such as, a few days after you have left on a trip. Since plants are usually watered sufficiently before leaving on a trip it is not necessary that they receive additional water right away so the water container 7, having outlet 8 in bottom 9 for watering a plant, is tightly sealed by placing stopper 10 in filling hole 11, in the top cover portion. A water receiver 14 having an open top is situated adjacent container 7 and a tube 15 having an end 17 tightly connected through the cover 12 of the container, and an opposite end 13 situated near the bottom of water receiver 14 serves as the air inlet passage to container 7. The end 13 of tube 15 is covered with water in receiver 14, such that water can drop from outlet 8 to water a plant only when the water in receiver 14 evaporates to a level below the end 13 of tube 15 to allow air to enter container 7. The quantity of water emerging from outlet 8 is controlled by adjustable valve 16 connected in tube 15.

However, it has been found that accurate water metering control is difficult to obtain with adjustable valves and according to the present invention it has been found that accurate drop-by-drop watering over an extended period can be obtained by closing the air inlet of a watering container with a stopper constructed of a porous material which in the dry state will pass a small quantity of air but will block the passage of air therethrough when it is in a well moistened condition. A watering container using such a stopper is illustrated in FIG. 3.

In FIG. 3, water container 18 is provided with a funnel-shaped bottom 19 having a water outlet 20 on its lower end. Top wall 21 of container 18 is depressed downwardly and is provided with a center hole closed with a porous stopper 22 constructed of ceramic material of special composition and formed with a hollow center 50 in the shape of a small pot or upwardly tapered plug. Container 18 may be stuck into the earth near the rim of a flower pot by means of a pointed stake 23 connected thereto, or it may be suspended over a plant by means of the eyelet ears 24 and 25.

As shown, the lower end 26 of the stopper 22 projects into the water in container 18 so that the stopper by capillary action of the porous material is sucked full of water to seal the container hermetically and prevent any air from entering the container. Stopper 22 is exposed to the atmosphere and the water therein evaporates and additional water is absorbed in the stopper from the container. Thus the water in the container is evaporated in this manner through the stopper 22 until the water level 27 drops below the lower end 26 of the stopper. During this evaporation period no water leaves opening 20, but rather air bubbles rise through outlet 20 to take the place of the evaporated water.

As soon as the water level 27 in the container drops below the lower end 26 of the stopper the stopper can then dry out by a continuation of the evaporation process. Upon becoming dry the pores are no longer blocked with water and small quantities of air now pass through the stopper 22 into the container so that now water is allowed to discharge from the outlet 20 in a dripping manner to water a plant. It can be seen that the outlet 20 and stopper 22 have thus exchanged functions.

The water device can be accompanied by a set of stoppers of varying porosity so that the dripping action can be adapted to different numbers of plants and their watering requirements at any time.

If it is desired to extend the time period, before dripping occurs, the hollow center 50 of stopper 22 is filled with water and this water must then be evaporated before the water level 27 can fall.

The period of time before dripping occurs can be extended even further by filling the horizontal annulus 51, formed by the depressed top wall 21, about the stopper 22 with a quantity of water. This water will keep the stopper 22 wet and must therefore be evaporated along with the water in space 50 before any of the water in container 18 can be evaporated to start the dripping action. The horizontal annulus or water tray feature 51 may have a capacity several times the capacity of the stopper at 50 and the construction is particularly advantageous when plants in the open air exposed to the weather have to be sufficiently watered for an extended time period. In damp weather, and even when the humidity rises stopper 22 checks the entrance of air into the container 18 as moisture blocks or partially blocks the pores in the stopper. In rainy weather a quantity of water will accumulate in the surrounding annular space 51 to thus saturate the stopper to stop the dripping action until sufficient evaporation, in accordance with the seepage and evaporation of water in the ground holding the plants has taken place so that air can again enter the chamber to commence the dripping action. The stopper 22 exposed to weather conditions thus accurately controls, without human supervision or help, the watering of plants according to their requirements in the prevailing atmospheric conditions.

A modified form of the watering device is shown in FIG. 4, where pipette 28 is provided with a closed lower end extension 29 which serves as a support for the device. A water outlet 32 is disposed in the bottom wall 30 of water chamber 31, in a position laterally offset from support rod 34. A collecting container 35 fixed to support rod 34, by means of a rubber ring 33 or the like, is disposed beneath outlet 32 and adapted to distribute water received therefrom to a multiplicity of distributing tubes 36 connected through the bottom wall 37. The distributing tubes extend to individual plants and consist of wool yarn thread 38 sheathed by protecting hoses 39 so that water absorbed by the threads cannot prematurely run off on some object which accidentally comes into contact with it, to deprive the plant of the water it requires.

The upper end 40 of tube 28 of the pipette is conically widened and is adapted to engage the funnel-like end 41 of a cup member 42 which has a conic center portion 43 engaging a sealing gasket ring 44 on the tapered bottom end 45 of the ceramic stopper 46. An intermediate piece (not shown) may equally be inserted in the upper end 40 of the pipette 28 having again on one end a conical part and on the other end a widening for the engagement of another conical part. This renders it possible to use the pipette shaped container at the same time as a holding rod for tender or climbing plants. The lower bore portion 47 inside the stopper 46 is adapted to contain a by-far smaller quantity of water than the overlying widened bore portion 48, and both spaces 47 and 48 contain only a small measure of the quantity of liquid which can be disposed in the surrounding annular tray or space 49 formed by the cup 42. The time which will lapse before the dripping action will begin depends upon the space or spaces filled with water. By exposing the stoppers of FIGS. 3 and 4 to atmospheric conditions, rain water will automatically fill the spaces 47, 48, 49, 50 and 51, so that when choosing the proper size of the spaces mentioned, the plant is again watered by the device as soon as the water is evaporated and the stoppers are dried out which occurs in unison with the drying action on the surrounding ground. In the form of the invention shown in FIG. 4 the stopper does not extend into the water in the container 31.

While the invention has been described in certain preferred embodiments, it is realized that modifications may be made and it is to be understood that no limitations upon the invention are intended other than those imposed by the scope of the appended claims.

What I claim is:

1. Watering device, consisting of a container for dropwise watering of plant roots with a water outlet on the bottom and an air inlet on the top, a stopper fitted into and closing said air inlet, made of porous material preventing the air from entering into the container, if it is extremely moistened, and being shaped in form of a small pot opening upwardly and exteriorly of the container.

2. A watering device for dropwise watering of plants comprising, a container adapted to receive a quantity of water, a water outlet on the bottom of said container, an air inlet on the top of said container, a stopper closing said air inlet, said stopper being constructed of porous material to prevent air from entering into said container when it is extremely moistened, and said stopper having a hollow portion opening upwardly adapted to receive water from exterior of said container.

3. A watering device for dropwise watering of plants comprising a container adapted to hold a quantity of water, a water outlet on the bottom of said container, an air inlet in the top of said container, an elongated plug of porous material closing said air inlet to prevent air from entering said container when extremely moistened and extending exteriorly of the container, a substantially horizontally extending wall portion having an upturned edge surrounding said air inlet and adapted to hold a quantity of water about the periphery of the exteriorly extending portion of said elongated plug.

4. A watering device for dropwise watering of plants comprising a container adapted to hold a quantity of water including a top wall portion and a bottom, a water outlet on said bottom, an air inlet in said top wall portion, an elongated stopper of porous material closing said air inlet and having an upper portion extending exteriorly of said container and a lower portion extending interiorly of said container depending beneath the interior of said top wall portion, said stopper being impervious to air when wet and disposed to contact water in said container to evaporate it exteriorly of said container through said upper portion to retard discharge of water from said container, and said stopper being pervious to air when dry to provide dropwise discharge of water from said water outlet.

5. A watering device as set forth in claim 4, said stopper being upwardly tapered and having a center depression opening upwardly and exteriorly of said container and adapted to hold a quantity of water.

6. A watering device as set forth in claim 5 in which said stopper is constructed of unglazed ceramic material.

References Cited in the file of this patent

UNITED STATES PATENTS

| 179,558 | High | July 4, 1876 |
| 880,968 | Bunker | Mar. 3, 1908 |
| 897,131 | Owen | Aug. 25, 1908 |
| 1,791,873 | Neiman | Feb. 10, 1931 |
| 2,423,173 | Brady et al. | July 1, 1947 |
| 2,634,028 | Brown | Apr. 7, 1953 |

FOREIGN PATENTS

| 12,057 | Great Britain | June 2, 1896 |
| 14,554 | Great Britain | June 24, 1907 |